United States Patent
Lee

(10) Patent No.: US 10,206,491 B2
(45) Date of Patent: Feb. 19, 2019

(54) EAR INSTRUMENT TO WHICH VARIOUS INSTRUMENTS AND ACCESSORIES CAN BE FIXED

(71) Applicant: Seung Chul Lee, Daegu (KR)

(72) Inventor: Seung Chul Lee, Daegu (KR)

( * ) Notice: Subject to any disclaimer, the term of this patent is extended or adjusted under 35 U.S.C. 154(b) by 0 days.

(21) Appl. No.: 15/545,052

(22) PCT Filed: Jan. 12, 2016

(86) PCT No.: PCT/KR2016/000269
§ 371 (c)(1),
(2) Date: Jul. 20, 2017

(87) PCT Pub. No.: WO2016/122139
PCT Pub. Date: Aug. 4, 2016

(65) Prior Publication Data
US 2018/0014628 A1    Jan. 18, 2018

(30) Foreign Application Priority Data

Jan. 28, 2015 (KR) .................. 10-2015-0013562
May 22, 2015 (KR) .................. 10-2015-0071450
Dec. 3, 2015 (KR) .................. 10-2015-0171179

(51) Int. Cl.
*A45F 5/00* (2006.01)
*H04R 1/10* (2006.01)
(Continued)

(52) U.S. Cl.
CPC .............. *A45F 5/00* (2013.01); *H04R 1/105* (2013.01); *A44C 7/009* (2013.01);
(Continued)

(58) Field of Classification Search
CPC .... A45F 5/00; A45F 2200/0508; A44C 7/009; H04M 1/6058; H04R 1/026; H04R 1/105
See application file for complete search history.

(56) References Cited

U.S. PATENT DOCUMENTS 2,671,221 A * 3/1954 Triplett .................. A61F 11/06
  2/208
2,769,322 A * 11/1956 Czuch ..................... A44C 7/00
  63/12
(Continued)

FOREIGN PATENT DOCUMENTS

JP    2001-160995 A    6/2001
KR    10-2008-0011504 A    2/2005
(Continued)

OTHER PUBLICATIONS

International Search Report for PCT/KR2016/000269 dated Jul. 19, 2016 from Korean Intellectual Property Office.

*Primary Examiner* — Robert Sandy
*Assistant Examiner* — David M Upchurch
(74) *Attorney, Agent, or Firm* — Paratus Law Group, PLLC

(57) ABSTRACT

An ear instrument, including: a first body; a second body having one end rotatably coupled to the first body; and a first fixing member having a side coupled to the other end of the second body. The first fixing member is coupled to the rear part of the user's ear when the ear instrument is fitted to the user's ear. The first fixing member is formed in a C-shape.

6 Claims, 3 Drawing Sheets

(51) Int. Cl.
*A44C 7/00* (2006.01)
*H04M 1/60* (2006.01)
*H04R 1/02* (2006.01)

(52) U.S. Cl.
CPC ... *A45F 2200/0508* (2013.01); *H04M 1/6058* (2013.01); *H04R 1/026* (2013.01)

(56) References Cited

U.S. PATENT DOCUMENTS

| | | | | |
|---|---|---|---|---|
| 3,353,372 | A * | 11/1967 | Rapaport | A44C 7/00 29/434 |
| 5,134,655 | A * | 7/1992 | Jensen | H04M 1/05 379/430 |
| 8,094,852 | B2 * | 1/2012 | Ikuma | H04R 1/105 381/330 |
| 9,807,493 | B1 * | 10/2017 | Willis | H04R 1/1008 |
| 2005/0120744 | A1 * | 6/2005 | Kim | A44C 7/004 63/12 |
| 2007/0025574 | A1 * | 2/2007 | Azima | H04R 1/1075 381/330 |
| 2008/0134720 | A1 * | 6/2008 | Harder | A44C 7/005 63/14.1 |
| 2011/0056241 | A1 * | 3/2011 | Li | A44C 7/00 63/12 |
| 2013/0276477 | A1 * | 10/2013 | Huynh | A44C 7/003 63/12 |
| 2015/0075219 | A1 * | 3/2015 | Huynh | A44C 5/00 63/12 |
| 2016/0037881 | A1 * | 2/2016 | Thomas | A44C 7/008 24/705 |

FOREIGN PATENT DOCUMENTS

| | | |
|---|---|---|
| KR | 10-2007-0026304 A | 3/2007 |
| KR | 10-2007-0111987 A | 11/2007 |
| KR | 20-0474629 Y1 | 10/2014 |
| KR | 10-2015-0029220 A | 3/2015 |

* cited by examiner

EAR INSTRUMENT TO WHICH VARIOUS INSTRUMENTS AND ACCESSORIES CAN BE FIXED

CROSS REFERENCE TO PRIOR APPLICATIONS

This application is a National Stage Patent Application of PCT International Patent Application No. PCT/KR2016/000269 (filed on Jan. 12, 2016) under 35 U.S.C. § 371, which claims priority to Korean Patent Application Nos. 10-2015-0013562 (filed on Jan. 28, 2015), 10-2015-0071450 (filed on May 22, 2015), and 10-2015-0171179 (filed on Dec. 3, 2015), which are all hereby incorporated by reference in their entirety.

TECHNICAL FIELD

The present invention relates to an ear instrument which allows various instruments and accessories to be fitted to user's ears in accordance with a user's use environment and preference.

BACKGROUND ART

A variety of ear instruments are being used. As an example of such ear instruments, there is an earphone which allows a predetermined accessory, for example, an ear ring, to be fitted to a user's ear or a user to listen to a sound, for example, a music, etc. with the earphone being fitted, in place, to the user's ear. Moreover, as an industry advances, a new ear instrument is being developed and used, which allows a user's ear to be fixed to a portable device, for example, various electronic chips, a mobile communication terminal, an ear set, a MP3 player, etc.

A conventional earphone device, in general, allows a user to focus on listening to music from a sound device with the earphone being fitted to a user's ear. In most case, the user does a variety of tasks, for example, a work, a book reading, an exercise, etc. while listening to music. If the user fits the earphone to his ears, the user may not hear external sounds except for the sound from the earphone since the earphone is blocking the ears. For this reason, the user may fall into the danger. If the user does outdoor exercise, for example, a jogging, a biking, etc. with the earphone being fitted to the user's ears, the user may not hear external sound, which could lead to falling into the danger. Moreover, if the user listens to music for long time through the earphone, the tympanic membrane inside the ear may be damaged.

In order to improve the aforementioned problems, the applicant of the present invention filed the Korean patent application number 10-2015-0029220. This patent application has a problem since the product easily separates from a user's ear when an external impact applies to the ear. Moreover, various accessories cannot be used.

More specifically, since the conventional ear instrument is manufactured for an exclusive use, the user must additionally purchase a predetermined instrument for each use, and the user must wear the instrument for each use. In this case, it is very inconvenient for the user to wear or take off the earphone. In the present invention, it urgently needs to resolve the aforementioned problems.

DISCLOSURE OF THE INVENTION

Accordingly, it is an object of the present invention to provide an ear instrument to which various instruments and accessories can be fixed, wherein any potential accident can be prevented in advance since a user can hear an external sound while the user is doing various tasks and even listening to music with the earphone being fitted to the user's ears. A variety of accessories and instruments can be used and exchanged in accordance with a user's preference and environment.

To achieve the above objects, there is provided an ear instrument to which various instruments and accessories can be fitted, wherein various instruments and accessories are fitted to a user's ears, which may include, but is not limited to, a first body, and a second body wherein one end thereof is hinged rotatable to the first body; and a first fixing member wherein one side thereof is coupled to the other end of the second body, and when the ear instrument is fitted to the user's ear, the first fixing member is coupled to the rear part of the user's ear, so the ear instrument is fixed to the user's ear, wherein the first fixing member is formed in a C-shape, and the first body and the second body are coupled in a hinge type, and when an external force applies, and the other ends of the first body and the second body open, it is inserted in the user's ear, and when the force having acted from the outside is removed, the other ends of the first body and the second body and the first fixing member are fixedly fitted to the user's ear.

Advantageous Effects

The present invention is able to provide the following advantages.

First, the present invention provides a speaker which may be attached to a user's ear, not fully inserted into a user's earhole, so the user is able to hear a sound through the speaker and an external sound together, thus preventing any potential accident which could occur since the user doesn't hear the sound. The speaker can be inserted in the user's earhole in a place where there may not any potential accident. In this way, the user is able to enjoy listening to music in such a way to fully block an external noise.

Second, since a variety of accessories and instruments can be simultaneously coupled to an ear instrument, the various accessories and instruments can be easily exchanged in accordance with a user's preference or environment.

BRIEF DESCRIPTION OF THE DRAWINGS

The present invention will become better understood with reference to the accompanying drawings which are given only by way of illustration and thus are not limitative of the present invention, wherein.

LEGEND OF REFERENCE NUMBERS

Figure 1:
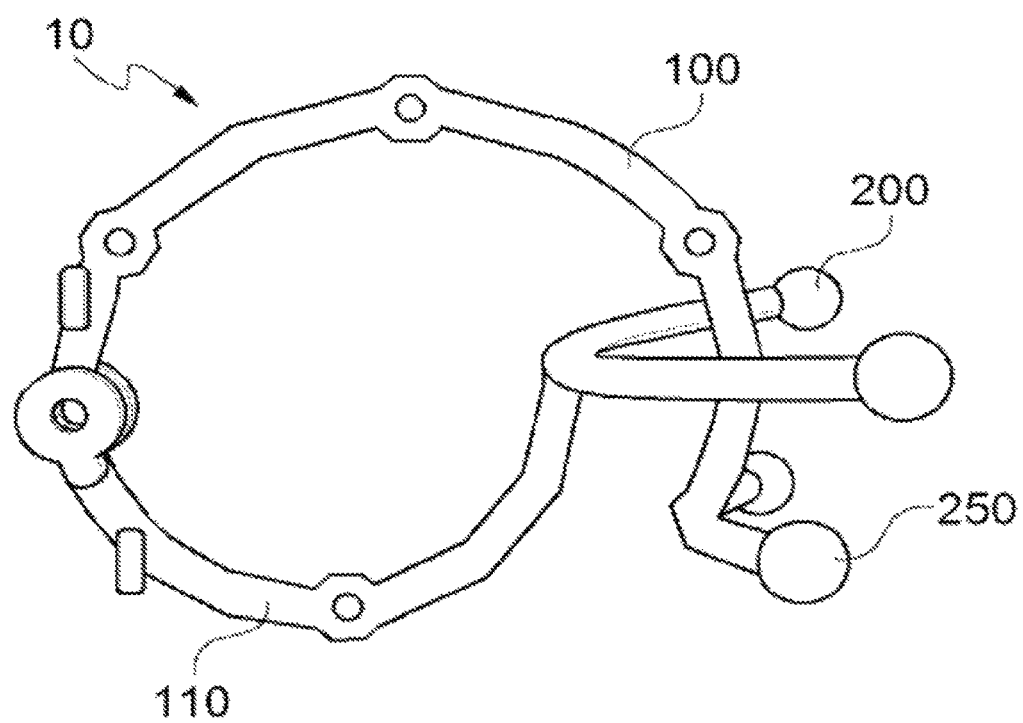
FIG. 1 is a perspective view illustrating an ear instrument according to the present invention.

10: Ear instrument
100: First body
110: Second body
150: Fixing part
200: First fixing member
250: Second fixing member
270: Third fixing member
300: First ring member

350: Second ring member
400: First elastic part

MODES FOR CARRYING OUT THE INVENTION

The preferred embodiments of the ear instrument to which various instruments and accessories can be fixed, according to the present invention will be described with reference to the accompanying drawings.

Figure 2:
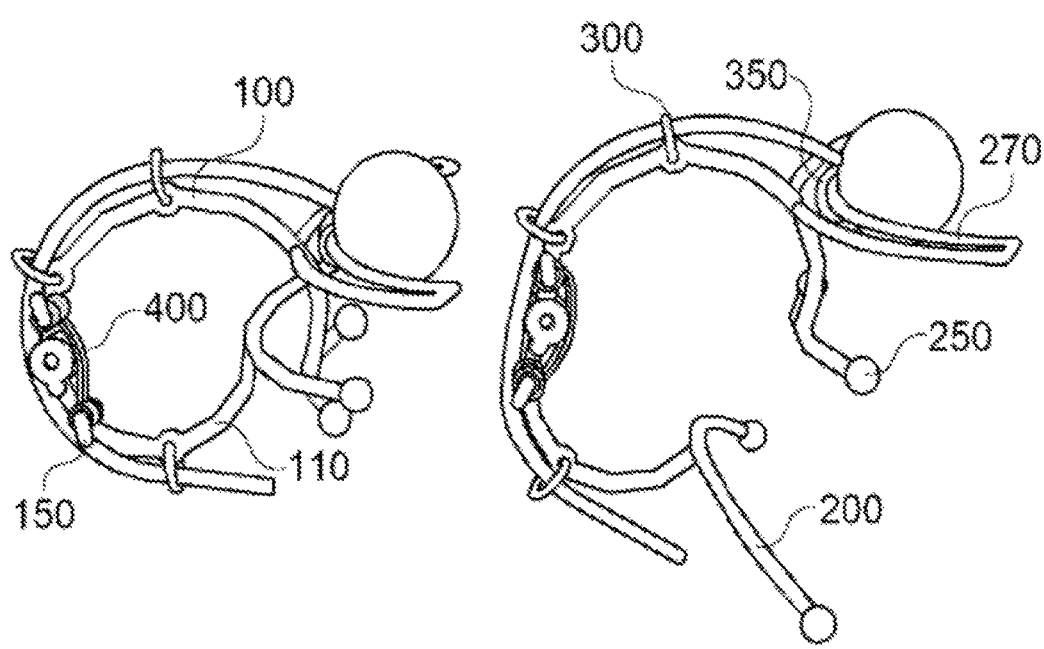
FIG. 2 is a view illustrating a configuration that a first elastic part in FIG. 1 is coupled and operates.
Figure 3:
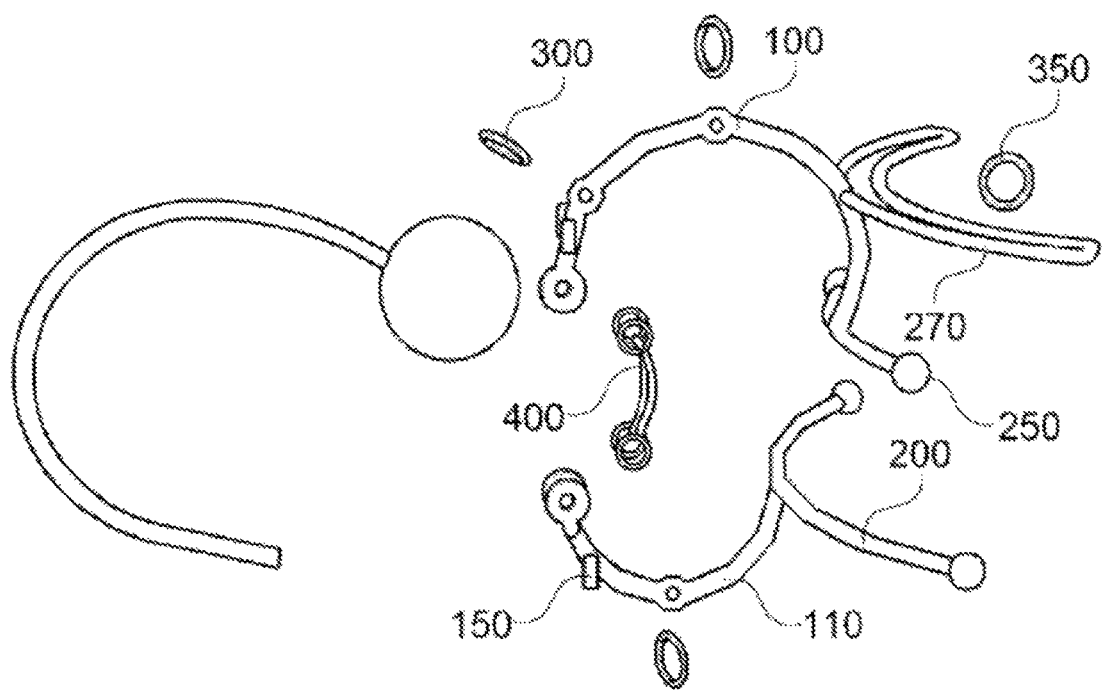
FIG. 3 is a separated perspective view illustrating an ear instrument in FIG. 2.

FIG. 1 is a perspective view illustrating an ear instrument according to the present invention, FIG. 2 is a view illustrating a configuration that a first elastic part in FIG. 1 is coupled and operates; and FIG. 3 is a separated perspective view illustrating an ear instrument in FIG. 2.

The present invention is referred to an ear instrument to which various instruments and accessories can be fitted, wherein various instruments and accessories are fitted to a user's ears, which may include, but is not limited to, a first body 100, and a second body 110 wherein one end thereof is hinged rotatable to the first body; and a first fixing member 200 wherein one side thereof is coupled to the other end of the second body 110, and when the ear instrument 10 is fitted to the user's ear, the first fixing member 200 is coupled to the rear part of the user's ear, so the ear instrument 10 is fixed to the user's ear, wherein the first fixing member 200 is formed in a C-shape, and the first body 100 and the second body 110 are coupled in a hinge type, and when an external force applies, and the other ends of the first body 100 and the second body 110 open, it is inserted in the user's ear, and when the force having acted from the outside is removed, the other ends of the first body 100 and the second body 110 and the first fixing member 200 are fixedly fitted to the user's ear.

The present invention is directed to an ear instrument 10 which may include the first body 100, the second body 110 and the first fixing member 200. As compared to the conventional ear instrument, a user is able to do various tasks while listening to music in safe, and various accessories and instruments can be concurrently coupled to the ear instrument 10 in accordance with a user's preference or environment.

A variety of ear instruments are being used. As an example of such ear instruments, there is an earphone which allows a predetermined accessory, for example, an ear ring, to be fixed to a user's ear or a user to listen to a sound, for example, a music, etc. with the earphone being fitted, in place, to the user's ear. Moreover, as an industry advances, a new ear instrument is developed and used, which allows a user's ear to be fixed to a portable device, for example, various electronic chips, a mobile communication terminal, an ear set, a MP3 player, etc.

In case of the conventional earphone, some users may focus on listening to sound from an audible device with the earphone being fitted to the user's ears; however most users may do various tasks, for example, a work, a book reading, a study, an exercise, etc. while listening to music. If the user inserts the earphone in the ear, the user may not hear an external sound except for the sound through the earphone since the earphone is blocking the ears, so the user may fall into the danger. If the user does an outdoor exercise, for example, a jogging, a biking, etc. with the earphone being fitted to the ears, the user may fall in the danger since the user does not hear any external sound. Moreover, the tympanic membrane inside the ear may be hurt.

In order to resolve the aforementioned problems, the applicant of the present invention filed the Korean patent application number 10-2015-0029220; however the product may easily separate from the ears, and various accessories cannot be used.

More specifically, since the conventional ear instrument is manufactured for an exclusive use, the user must additionally purchase a predetermined instrument for each use, and the user must wear the instrument for each use. In this case, it is very inconvenient for the user to wear or take off the earphone. In the present invention, it urgently needs to resolve the aforementioned problems.

The present invention is provided to resolve the aforementioned problems. The present invention aims to provide an ear instrument to which various instruments and accessories can be fixed, wherein any potential accident can be prevented in advance since a user can hear an external sound while the user is doing various tasks and even listening to music with the earphone being fitted to the user's ears. A variety of accessories and instruments can be used and exchanged in accordance with a user's preference and environment.

The present invention provides a speaker which may be attached to a user's ear, not fully inserted into a user's earhole, so the user is able to hear a sound through the speaker and an external sound together, thus preventing any potential accident which could occur since the user doesn't hear the sound. The speaker can be inserted in the user's earhole in a place where there may not any potential accident. In this way, the user is able to enjoy listening to music in such a way to fully block an external noise. Moreover, since a variety of accessories and instruments can be simultaneously coupled to an ear instrument, the various accessories and instruments can be easily exchanged in accordance with a user's preference or environment.

The first body 100 and the second body 110 correspond to the body part of the ear instrument 10 and may be manufactured in various profiles. As an example, the first body 100 and the second body 110 may be manufactured in a C-shape. When the ear instrument 10 is fitted to the user's ears, it allows the user's ear to be inserted between the first body 100 and the second body 110. The first body 100 and the second body 110 may be configured in such a way that an end of each of the first body 100 and second body 110 is hinged rotatable to each other. If an external force acts on the first body 100 and the second body 110, the other ends thereof open and are inserted into the user's ears, and the acting external force is removed, the other ends of the first body 100 and the second body 110 are fixedly coupled to the user's ears. The other ends of the first body 100 and the second body 110 are arranged and engaged in the same direction. As long as a material satisfies the required strength of the first body 100 and the second body 110, various materials may be used.

The first fixing member 200 is a C-shaped member, wherein one part of the first fixing member 200 may be coupled to the other end of the second body 110, and when the ear instrument 10 is fitted to the user's ear, it will be coupled to the rear part of the user's ear, so the ear instrument 10 will be fixed to the user's ear. When the ear instrument 10 is fitted to the user's ear, the first fixing member 200 will be coupled to the rear part of the user's ear and will allow the ear instrument 10 to be easily detached from the user's ear and may be manufactured in various profiles.

As an example, the first fixing member 200 is a C-shaped member of which one part is coupled to the other end of the second body 110, and when the ear instrument 10 is fitted to the user's ear, it will be coupled to the rear part of the user's ear, and the ear instrument 10 will be tightly fixed to the user's ear, thus preventing the ear instrument from moving up or down and reducing any pain at the ear since the contacting surface increases. More specifically, when the ear instrument 10 is fitted to the user's ear, the ear can be inserted between the other end of the second body 110 and the first fixing member 200 and the other end of the first body 100 and can be engaged.

The present invention may further include a bar-shaped fixing part 150 which is coupled to one part of each of the first body 100 and the second body 110. The fixing member 150 is a member which allows both ends of the first elastic part 400 to be hooked and fixed to the first body 100 and the second body 110.

As long as a material satisfies the required strength, the first fixing member 200 may be made of various materials.

The present invention may further include a first ring member 300 which will be installed at a side surface of the first body 100 and the second body 110, thus allowing various instruments and accessories to be fixed to the ear instrument 10. As long as the first ring member 300 allows various instruments and accessories to be installed at the ear instrument 10, it can be manufactured in various shapes. As an example, it may be manufactured in a circular ring shape. If the first ring member 300 is a circular ring shape, the earphone will be hung over the ear instrument 10 in such a way only a part of the earphone among various instruments passes through the center of the ring. If it is an accessory, various accessories may be hung over the ear instrument 10 in such a way that a part thereof is fixedly inserted into a through hole of the first ring member 300. According to another example of the present invention, the first ring member 300 will be coupled to both outer surfaces of the first body 100 or the second body 110, so a part of the earphone among various instruments can be inserted and coupled.

As long as a material satisfies the required strength, the first ring member 300 will be made of various materials. For the sake of easier manufacturing, the first body 100 and the second body 110 may be made of the same materials.

The present invention may further include a second fixing member 250 which will allow the ear instrument 10 to be more stably fitted to the user's ear. More specifically, the present invention may further include a second fixing member 250 of which one side is coupled to one side surface of the first body 100, and when the ear instrument 10 is fitted to the user's ear, it will be inserted in the groove formed at the inner side of the user's ear, and the ear instrument 10 will be fixed to the user's ear. The second fixing member 250 may be installed alone without the first fixing member 200 so as to facilitate the fitting of the ear instrument 10. Alternatively, it may be coupled to the first body 100 of the ear instrument 10 where the first fixing member 200 has been installed, thus allowing the ear instrument 10 to be more stably fixed to the user's ear. When the ear instrument 10 is fitted to the user's ear, the second fixing member 250 will allow the user's ear to be inserted between the first fixing member 200 and the second fixing member 250, so the ear instrument 10 can be more stably fitted.

When the ear instrument 10 is fitted to the user's ear, the second fixing member 250 will be coupled to the groove formed at the inner side of the user's ear, and the ear instrument 10 will be tightly fixed to the user's ear, thus preventing the ear instrument from moving up and down, and the second fixing member 250 will allow increasing the contacting surface, thus reducing any pain at the user's ear. It may be manufactured in various profiles and may be coupled. As an example, the second fixing member 250 may be made in a C-shape, wherein one part of the outer side surface thereof will be coupled to one side surface of the first body 100, and when the ear instrument 10 is fitted to the user's ear, it will be inserted in the groove formed at the inner side of the user's ear, so the ear instrument 10 can be tightly fixed to the user's ear.

As long as a material satisfies the required strength of the second fixing member 250, various materials may be used.

The present invention may further include a third fixing member 270 and a second ring member 350 which may allow the ear instrument 10 to be more stably engaged and fitted to the user's ear, while allowing the positions of various instruments like an earphone to be changed.

The third fixing member 10 is a C-shaped member, wherein one side thereof will be coupled to one side surface of the first body 100 and will be inserted in the groove formed at an outer part of the inner side of the user's ear when the ear instrument 10 is fitted to the user's ear, thus allowing the ear instrument 10 to be fixed to the user's ear. The third fixing member 270 includes a through hole formed in the longitudinal direction. The third fixing member 270 may allow the user's ear to be inserted between the first fixing member 200 and the third fixing member 270 when the ear instrument 10 is fitted to the user's ear, so the ear instrument 10 can be stably fitted.

Moreover, the third fixing member 270 provides a guide function to move the instrument, for example, the speaker of the earphone, in the longitudinal direction.

The second ring member 350 is a member which is installed to move along the through hole of the third fixing member 270 and is able to fix various instruments and accessories. More specifically, since the second ring member 350 is able to move in the longitudinal direction of the third fixing member 270 in a state where the instrument like the speaker of the earphone is coupled, it is able to allow using the speakers in various forms.

As long as a material satisfies the required strength, various materials may be used to manufacture the third fixing member 270 and the second ring member 350.

The present invention may further include a first elastic part 400 which can be elastically transformed by an external force and can be recovered with its own recovery force, wherein one part thereof will be coupled to the first body 100, and the other part thereof will be coupled to the second body 110. The fixing part is provided at the first body 100 and the second body 110, so it can be easily fixed to the first body 100 and the second body 110 in such a way that the first elastic part 550 is hooked by the fixing part. The first elastic part 500 may allow the other sides of the first body 100 and the second body 110 to contact each other with the aid of the elastic force thereof if a force having acted to open the other sides of the first body 100 and the second body 110 is removed.

If the first elastic part 550 is able to be recovered by its own elastic force, various elastic parts can be used. As an example, the first elastic part 550 may be made of an 8-shaped rubber member, wherein one side of the first body 100 is inserted in the hole formed at one side, and one side of the second body 110 is inserted in the hole of the other side.

While the ear instrument to which various instruments and accessories can be fitted, according to the preferred embodiments of the present invention has been described, it is just referred to one embodiment of the present invention. In this regard, the technical concept, configuration and operation of the present invention are not limited thereto. As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An ear instrument to which various instruments and accessories are able to be fitted, comprising:
    a first body having a first end and a second end opposite to each other;
    a second body having a first end rotatably hinged to the first end of the first body and a second end opposite to the first end of the second body;
    a first fixing member having one side coupled to the second end of the second body, and
    a ring member which is installed at one side surface of the first body or the second body and is configured to fix various instruments and accessories thereto,
    wherein the first fixing member is configured to be coupled to a rear part of a user's ear when the ear instrument is fitted to the user's ear,
    wherein the first fixing member is formed in a C-shape, and the first body and the second body are rotatably coupled to each other, and
    wherein the second ends of the first body and the second body are open when an external force applies thereto so that the user's ear is able to be inserted between the first body and the second body, and the second ends of the first body and the second body and the first fixing member are fixedly fitted to the user's ear when the applied external force is removed.

2. The instrument of claim 1, further comprising a second fixing member having one side coupled to the second end of the first body,
    wherein the second fixing member is configured to be inserted in a groove formed at an inner part of the user's ear when the ear instrument is fitted to the user's ear, and
    wherein the second fixing member is formed in a C-shape, and when the ear instrument is fitted to the user's ear, the second fixing member is configured to allow the user's ear to be stably inserted between the first fixing member and the second fixing member, so the ear instrument is able to be fitted stable.

3. An ear instrument to which various instruments and accessories are able to be fitted, comprising:
    a first body having a first end and a second end opposite to each other;
    a second body having a first end rotatably hinged to the first end of the first body and a second end opposite to the first end of the second body;
    a first fixing member having one side coupled to the second end of the second body, and
    a first ring member which is installed at one side surface of the first body or the second body and is configured to fix various instruments and accessories thereto,
    wherein the first fixing member is configured to be coupled to a rear part of a user's ear when the ear instrument is fitted to the user's ear,
    wherein the first fixing member is formed in a C-shape, and the first body and the second body are rotatably coupled to each other, and
    wherein the second ends of the first body and the second body are open when an external force applies thereto so that the user's ear is able to be inserted between the first body and the second body, and the second ends of the first body and the second body and the first fixing member are fixedly fitted to the user's ear when the applied external force is removed,
    wherein the ear instrument further comprises:
    a second fixing member having one side coupled to a portion of the first body, wherein the second fixing member is configured to be inserted in a groove formed at an outer side of an inner part of the user's ear when the ear instrument is fitted to the user's ear, wherein a through hole is formed in a longitudinal direction of the second fixing member, and the second fixing member is formed in a C-shape; and
    a second ring member which is installed to move along the through hole of the second fixing member and is configured to fix various instruments and accessories thereto, wherein the second fixing member is configured to allow the user's ear to be stably inserted between the first fixing member and the second fixing member, so the ear instrument is able to be fitted stable.

4. An ear instrument to which various instruments and accessories are able to be fitted, comprising:
    a first body having a first end and a second end opposite to each other;
    a second body having a first end rotatably hinged to the first end of the first body and a second end opposite to the first end of the second body;
    a first fixing member having one side coupled to the second end of the second body, and
    a ring member which is installed at one side surface of the first body or the second body and is configured to fix various instruments and accessories thereto,
    wherein the first fixing member is configured to be coupled to a rear part of a user's ear when the ear instrument is fitted to the user's ear,
    wherein the first fixing member is formed in a C-shape, and the first body and the second body are rotatably coupled to each other, and
    wherein the second ends of the first body and the second body are open when an external force applies thereto so that the user's ear is able to be inserted between the first body and the second body, and the second ends of the first body and the second body and the first fixing member are fixedly fitted to the user's ear when the applied external force is removed,
    wherein the ear instrument further comprises:
    an elastic part which is able to be transformed by an external force and is able to elastically recover by an elastic force thereof, wherein the elastic part includes a first side coupled to the first body, and a second side coupled to the second body, and the first elastic part is configured to allow the second ends of the first body and the second body to contact each other by the elastic force thereof when the external force applied to open the second ends of the first body and the second body is removed.

5. The instrument of claim 4, wherein the elastic part is made of an 8-shaped rubber member wherein a portion of the first body is inserted in a hole formed at the first side of the elastic part, and a portion of the second body is fixedly inserted in a hole formed at the second side of the elastic part.

6. The instrument of claim 4, further comprising a fixing part which is made in a bar shape and is coupled to one side of each of the first body and the second body, and the fixing part is configured to fixedly hook the elastic part.

* * * * *